United States Patent [19]

Suzuki et al.

[11] Patent Number: 4,862,787
[45] Date of Patent: Sep. 5, 1989

[54] REACTION MECHANISM FOR BRAKE BOOSTER

[75] Inventors: Haruo Suzuki; Yasuo Tsuyuki, both of Saitama, Japan

[73] Assignee: Jidosha Kiki Co., Ltd., Tokyo, Japan

[21] Appl. No.: 146,835

[22] Filed: Jan. 22, 1988

[30] Foreign Application Priority Data

Jan. 28, 1987 [JP] Japan .................................. 62-11119

[51] Int. Cl.⁴ ................................................ F15B 9/10
[52] U.S. Cl. .................................. 91/369.2; 91/376 R
[58] Field of Search ............. 91/369 A, 376 R, 369.1, 91/369.2, 369.3, 369.4; 60/547.1

[56] References Cited

U.S. PATENT DOCUMENTS

| | | | |
|---|---|---|---|
| 4,437,390 | 3/1984 | Ohta | 91/369 A X |
| 4,487,105 | 12/1984 | Harrison | 91/376 R X |
| 4,633,757 | 1/1987 | Kubota | 91/369 A X |
| 4,643,075 | 2/1987 | Wagner | 91/369 A |
| 4,671,167 | 6/1987 | Endo et al. | 91/376 R X |

FOREIGN PATENT DOCUMENTS

| | | |
|---|---|---|
| 53-40618 | 9/1978 | Japan . |
| 57-28059 | 2/1982 | Japan . |
| 124455 | 7/1984 | Japan ............................... 91/369 A |

Primary Examiner—Robert E. Garrett
Assistant Examiner—Mark A. Williamson
Attorney, Agent, or Firm—Flynn, Thiel, Boutell & Tanis

[57] ABSTRACT

A reaction mechanism for brake booster is disclosed. The end face of one end of an output shaft is formed with a recess in which a reaction disc is received. Part of the reaction disc and a valve body include projections extending into the other to establish a tight contact between part of the reaction disc and the valve body, which region is effective to achieve a hermetic seal in a reliable manner.

6 Claims, 2 Drawing Sheets

REACTION MECHANISM FOR BRAKE BOOSTER

FIELD OF THE INVENTION

The invention relates to a reaction mechanism for brake booster, and more particularly, to a reaction mechanism which transmits a force applied to an output shaft as a reaction to a braking operation to an input shaft through a reaction disc.

DESCRIPTION OF THE PRIOR ART

Generally, a reaction mechanism for brake booster comprises a valve body which is slidably disposed within a shell and having an axial portion in which bores of a larger and a smaller diameter are formed, with a valve plunger slidably fitted in the bore of the smaller diameter to define a valve mechanism, and one end of the output shaft being slidably fitted into the bore of the larger diameter. A brake reaction applied to the output shaft is transmitted to the valve plunger and an input shaft connected thereto through a reaction disc which is interposed between the output shaft and the valve plunger.

There has been proposed a reaction mechanism for brake booster in the prior art (see Japanese Utility Model Publication No. 40,618/1978) in which the periphery of the reaction disc is formed with an annular projection which is disposed in tight contact with the inner peripheral surface of the bore of the larger diameter, thereby allowing the reaction disc to prevent reliably a communication between a constant pressure chamber formed on one side and a variable pressure chamber formed on the other side of the valve body or the atmosphere through the both bores.

There has also been proposed a reaction mechanism in which the end face of said end of the output shaft is formed with a recess which receives a reaction disc to permit a reduction in the axial size of the brake booster, by achieving an overlapped arrangement of the axial size of the reaction disc and the axial size of said end of the output shaft, without requiring a reduction in the volume of the reaction disc (see Japanese Laid-Open Utility Model Application No. 28,059/1982).

However, in the reaction mechanism in which the reaction disc is received in the recess formed in the end face of one end of the output shaft, there is no tight contact between the reaction disc and the bore of the larger diameter, thereby resulting in a failure to interrupt a communication between the both bores by means of the reaction disc.

SUMMARY OF THE INVENTION

In view of the foregoing, in accordance with the invention, the end face of one end of the output shaft is formed with a recess within which a reaction disc is received. An annular groove is formed in the end face of a step defined between bores of a larger and a smaller diameter while an annular projection projecting toward an output shaft is formed around the bore of the smaller diameter so as to be inserted into the recess, thereby fitting part of the reaction disc onto at least one of the inside or the outside of the annular projection so that said part of the reaction disc interrupts the communication between the both bores.

With this arrangement, the interruption of a communication between the both bores by part of the reaction disc is effective to prevent the occurrence of a communication between one side and the other side of the valve body through the both bores, in a reliable manner.

Above and other objects, features and advantages of the invention will become apparent from the following description of several embodiments thereof with reference to the drawings.

DETAILED DESCRIPTION OF EMBODIMENTS

Figure 1:
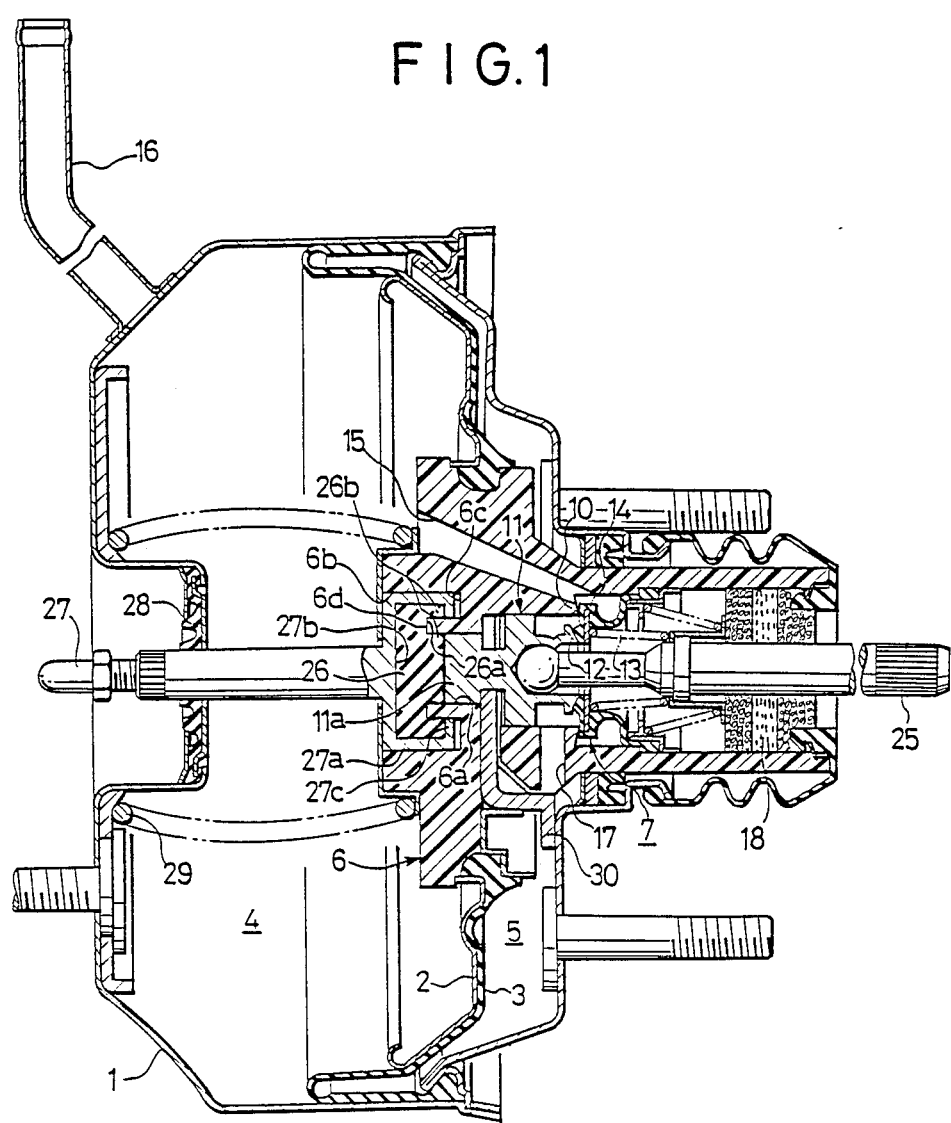
FIG. 1 is a cross section of one embodiment of the invention.

Referring to the drawings, several embodiments of the invention will now be described. Initially referring to FIG. 1, a brake booster includes a shell 1 in which a power piston 2 is slidably disposed. A diaphragm 3 is applied to the back surface of the power piston 2, and the combination of the power piston 2 and the diaphragm 3 divides the interior of the shell 1 into a forwardly located, constant pressure chamber 4 and a rearwardly located variable pressure chamber 5. A valve body 6 is integrally formed with an axial portion of the power piston 2 and receives a valve mechanism 7 therein which switches a fluid path.

The valve mechanism 7 comprises a first valve seat 10 formed on the valve body, a second valve seat 12 formed on a valve plunger 11, and a valve element 14 which is adapted to be seated upon either valve seat 10 or 12 under the resilience of the spring 13 which urges the valve element from the backside of the power piston 2 or from the right as viewed in FIG. 1. A region located externally of a seal defined between the first valve seat 10 and the valve element 14 communicates with the constant pressure chamber 4 through a passage 15 which is formed in the valve body 6, and the chamber 4 communicates with a source of negative pressure such as an intake manifold of an engine, through a negative pressure introducing tube 16 which is mounted on the shell 1.

On the other hand, a region located intermediate the seal between the first valve seat 10 and the valve element 14 and another seal defined between the second valve seat 12 and the valve element 14 communicates with the variable pressure chamber 5 through a passage 17 formed in the valve body 6. A region located inside the seal defined between the second valve seat 12 and the valve element 14 communicates with the atmosphere through a filter 18.

The valve plunger 11 which forms the valve mechanism 7, is connected to an input shaft 25 which is mechanically coupled to a brake pedal, not shown. The front end face of the valve plunger 11 is mechanically coupled to an output shaft 27 through a reaction disc 26 interposed therebetween. The output shaft 27 extends through a seal member 28 to project externally of the shell 1 for connection to a piston of a master cylinder, not shown.

The power piston 2 and the valve body 6 are normally maintained in their inoperative positions by a return spring 29. In such inoperative condition, a key member 30 which is effective to prevent the withdrawal of the valve plunger 11 from the valve body 6 is disposed in abutment against the internal wall surface of the shell 1 to limit a free movement to the right of the valve plunger 11 relative to the valve body 6 so that whenever the input shaft 25 and hence the valve plunger 11 is actuated, a fluid circuit is immediately switched by the action of the valve mechanism 7.

The valve plunger 11 has a front end 11a which is slidably fitted into a bore 6a of a small diameter formed in the axial portion of the valve body 6 while a right-hand end 27a of the output shaft 27 is slidably fitted into a bore 6b of a larger diameter which is located forward of the bore 6a. An annular groove 6c is formed in a step defined between the both bores 6a and 6b, thereby also forming an annular projection 6d which is located at the front end of the bore 6a.

The right-hand end face of the end 27a of the output shaft 27 is formed with a recess 27b, in which the annular projection 6d is loosely fitted. A flange 27c extends around the opening of the recess 27b and also extends radially inward into sliding contact with the outer peripheral surface of the annular projection 6d.

The reaction disc 26 is received within the recess 27b and has a right-hand end face in which an annular groove 26a is formed for receiving the front end of the annular projection 6d. By fitting the front end of the annular projection 6d into the annular groove 26a, the right end of the reaction disc 26 can be fitted around the inside and the outside of the annular projection 6d.

It is to be noted that an annular rib 26b is circumferentially formed around the reaction disc 26 in its region where the annular projection 6d is fitted therein and is disposed in tight contact with the inner and the outer peripheral surface of the annular projection 6d under natural conditions.

In the arrangement described above, when a brake pedal, not shown, is depressed to move the input shaft 25 and the valve plunger 11 to the left, the valve element 14 will be seated upon the first valve seat 10 on the valve body 6 to interrupt the communication between the chambers 5 and 4, and also will move away from the second valve seat 12 on the valve plunger 11 to enable a communication between the atmosphere and the chamber 5. Consequently, the atmosphere is supplied to the chamber 5, developing a pressure differential across the power piston 2, which is therefore advanced or forced forward against the resilience of the return spring 19 to provide a braking action in a manner well known in the art.

The brake reaction applied to the output shaft 27 is then transmitted from the output shaft 27 to the input shaft 25 through the reaction disc 26 and the valve plunger 11 with a servo ratio which is determined by the ratio of the area of the front end of the annular projection 6d with respect to the area of the front end 11a of the valve plunger 11 since the pressure applied to a portion of the reaction disc 26 which is located outside the outer peripheral surface of the annular projection 6d acts only upon the output shaft 27.

As a consequence, the servo ratio can be maintained small if the diameter of the reaction disc 26 is increased to secure sufficient volume therefor, thus avoiding an increase in the axial size of the brake booster. It would be appreciated that an increase in the axial size of the brake booster would result if a peripheral portion of the reaction disc 26 located outside the outer periphery of the annular projection 6d is omitted while increasing the axial size of the reaction disc 26 to compensate for a reduction in the volume thereof.

If the brake pedal is now released under this condition, the valve element 14 will be seated upon the second valve seat 12 on the valve plunger 11 to interrupt the communication between the variable pressure chamber 5 and the atmosphere while establishing a communication between the chambers 5 and 4 as a result of a movement of the valve element 14 away from the first valve seat 10, whereby the power piston 2 is returned to its inoperative position under the resilience of the return spring 29.

When the power piston 2 moves back to cause the key member 30 to abut against the internal wall surface of the shell 1, a rearward movement of the valve plunger 11 which is mechanically coupled thereto ceases. However, the power piston 2 and the valve body 6 continues to move back, with a retracting movement of the valve body 6 bringing the first valve seat 10 on the valve body 6 close to the valve element 14 until the clearance therebetween is substantially equal to zero, whereupon the valve body 6 comes to a stop by abutment against the key member 30 or where the valve body 6 is capable of continuing its retracting movement without abutment against the key member 30, the second valve seat will be open to admit the atmosphere into the variable pressure chamber 5, causing the power piston 2 to move forward slightly where it comes to a stop while closing both the first and the second valve seat. Accordingly, when the input shaft 25 is driven forward for the next time, the fluid path of the valve mechanism 7 can be immediately switched.

Figure 2:
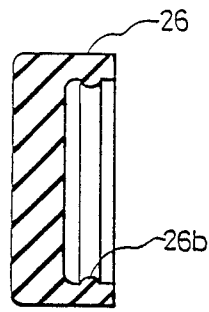
FIG. 2 is a cross section of a reaction disc used in a modification of the embodiment shown in FIG. 1.

In the inoperative condition of the brake booster, if the valve body 6 comes to a stop by abutment against the key member 30 and hence when no compressive force is applied to the reaction disc 26, the annular rib 26b formed around the reaction disc 26 in the region where it is fitted around the annular projection 6d so that a tight contact of the annular projection 26b with both the outer and the inner peripheral surface of the annular projection 6d is established reliably prevents a communication from being established between the constant pressure chamber 4 on one side of the valve body and the variable pressure chamber 5 located on the other side or the atmosphere through the both bores 6b and 6a. Where a reduced volume will be used for the reaction disc it is also possible to configure the reaction disc 26 such that the right end thereof is fitted around only the outside of the annular projection 6d, as shown in FIG. 2.

Figure 3:
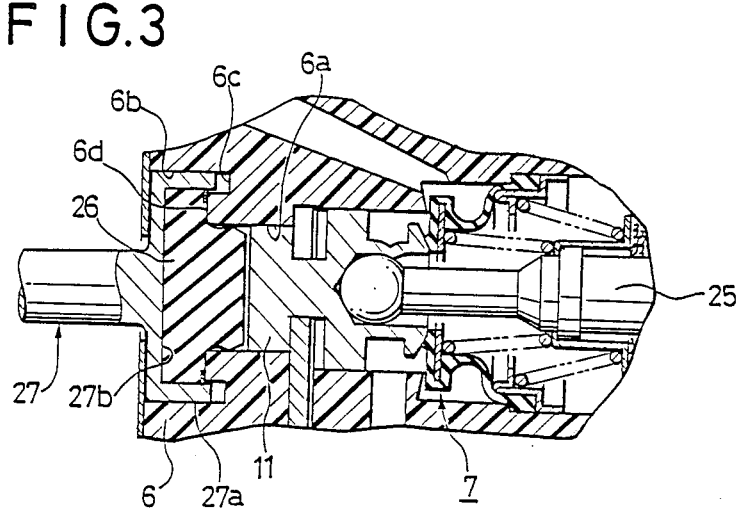
FIG. 3 is a cross section of part of another embodiment of the invention.
Figure 4:
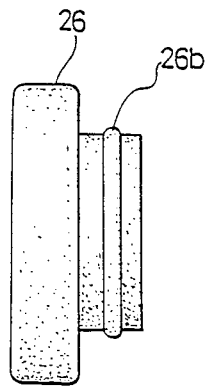
FIG. 4 shows the external profile of a reaction disc shown in FIG. 3.

FIG. 3 shows another embodiment of the invention where the outer peripheral surface of the annular projection 6d shown in the embodiment of FIG. 1 is disposed in sliding contact with the inner peripheral surface of the recess 27b formed in the output shaft 27. The configuration of the reaction disc 26 which is employed in this instance is illustrated in FIG. 4. It will be obvious that a communication between the both bores 6b and 6a can be reliably interrupted with this embodiment.

While the invention has been described above in connection with several embodiments thereof, it should be understood that a number of changes, modifications and substitutions will readily occur to one skilled in the art without departing from the spirit and scope of the invention defined by the appended claims.

What is claimed is:

1. A reaction mechanism for brake booster including a shell within which a valve body is slidably disposed and having an axial portion in which bores of a larger and a smaller diameter are formed in contiguous relationship, a valve plunger forming a valve mechanism which is slidably fitted into the bore of the smaller diameter, an output shaft having its one end slidably fitted into the bore of the larger diameter, and a reaction disc interposed between the output shaft and the valve plunger and through which a brake reaction applied to the output shaft is transmitted to the valve plunger and hence to an input shaft connected therewith;

characterized in that said one end of the output shaft is formed with a recess in its end face in which the reaction disc is received, an annular groove being formed in the end face of a step defined between the bores of the larger and the smaller diameter to form an annular projection around the bore of the smaller diameter which projects toward the output shaft, the annular projection being inserted into the recess, part of the reaction disc being fitted either inside or outside the annular projection so that said part of the reaction disc is effective to interrupt a communication between the bores of the larger and the smaller diameter, in which said part of the reaction disc is fitted around both the inner and the outer peripheral surface of the annular projection.

2. The apparatus of claim 1 in which the recess formed in the end face of the output shaft is provided with a flange extending around the opening thereof and extending radially inward into sliding contact with the outer peripheral surface of the annular projection.

3. A reaction mechanism for brake booster including a shell within which a valve body is slidably disposed and having an axial portion in which bores of a larger and a smaller diameter are formed in contiguous relationship, a valve plunger forming a valve mechanism which is slidably fitted into the bore of the smaller diameter, an output shaft having its one end slidably fitted into the bore of the larger diameter, and a reaction disc interposed between the output shaft and the valve plunger and through which a brake reaction applied to the output shaft is transmitted to the valve plunger and hence to an input shaft connected therewith;

characterized in that said one end of the output shaft is formed with a recess in its end face in which the reaction disc is received an annular groove being formed in the end face of a step defined between the bores of the larger and the smaller diameter to form an annular projection around the bore of the smaller diameter which projects toward the output shaft, the annular projection being inserted into the recess, part of the reaction disc being fitted either inside or outside the annular projection so that said part of the reaction disc is effective to interrupt a communication between the bores of the larger and the smaller diameter, in which said part of the reaction disc is fitted only around the outer peripheral surface of the annular projection.

4. The apparatus of claim 3 in which the recess formed in the end face of the output shaft is provided with a flange extending around the opening thereof and extending radially inward into sliding contact with the outer peripheral surface of the annular projection.

5. A reaction mechanism for brake booster including a shell within which a valve body is slidably disposed and having an axial portion in which bores of a larger and a smaller diameter are formed in contiguous relationship, a valve plunger forming a valve mechanism which is slidably fitted into the bore of the smaller diameter, an output shaft having its one end slidably fitted into the bore of the larger diameter, and a reaction disc interposed between the output shaft and the valve plunger and through which a brake reaction applied to the output shaft is transmitted to the valve plunger and hence to an input shaft connected therewith, said one end of the output shaft being formed with a recess in its end face in which the reaction disc is received, an annular groove being formed in the end face of a step defined between the bores of the larger and the smaller diameter to form an annular projection which continues the bore of the smaller diameter and projects toward the output shaft, the annular projection being inserted into the recess, the bore of smaller diameter extending at substantially the same diameter beyond the valve plunger to the free end of said annular projection, the reaction disc having a reduced diameter central projection fitted entirely inside the bore of smaller diameter extending through the annular projection so that said reduced diameter central projection of the reaction disc is effective to interrupt flow in the bore of smaller diameter and thus communication between the bores of the larger and the smaller diameter, said reduced diameter central projection of the reaction disc being formed with a circumferentially extending annular rib which is disposed in tight contact with the inner peripheral surface of the bore of the small diameter extending through the annular projection.

6. A reaction mechanism for brake booster including a shell within which a valve body is slidably disposed and having an axial portion in which bores of a larger and a smaller diameter are formed in contiguous relationship, a valve plunger forming a valve mechanism which is slidably fitted into the bore of the smaller diameter, an output shaft having its one end slidably fitted into the bore of the larger diameter, and a reaction disc interposed between the output shaft and the valve plunger and through which a brake reaction applied to the output shaft is transmitted to the valve plunger and hence to an input shaft connected therewith;

characterized in that said one end of the output shaft is formed with a recess in its end face in which the reaction disc is received, an annular groove being formed in the end face of a step defined between the bores of the larger and the smaller diameter to form an annular projection around the bore of the smaller diameter which projects toward the output shaft, the annular projection being inserted into the recess, part of the reaction disc being fitted either inside or outside the annular projection so that said part of the reaction disc is effective to interrupt a communication between the bores of the larger and the smaller diameter, in which the recess formed in the end face of the output shaft is provided with a flange extending around the opening thereof and extending radially inward into sliding contact with the outer peripheral surface of the annular projection.

* * * * *